(12) United States Patent
Wang et al.

(10) Patent No.: US 11,824,996 B2
(45) Date of Patent: Nov. 21, 2023

(54) PARACHAIN DATA SYNCHRONIZATION METHOD, DEVICE AND STORAGE MEDIUM

(71) Applicant: JIANGSU FUZAMEI TECHNOLOGY CO., LTD., Suzhou (CN)

(72) Inventors: Zhiwen Wang, Suzhou (CN); Sijin Wu, Suzhou (CN)

(73) Assignee: JIANGSU FUZAMEI TECHNOLOGY CO., LTD, Suzhou (CN)

( * ) Notice: Subject to any disclaimer, the term of this patent is extended or adjusted under 35 U.S.C. 154(b) by 443 days.

(21) Appl. No.: 17/272,622

(22) PCT Filed: Aug. 26, 2019

(86) PCT No.: PCT/CN2019/102509
§ 371 (c)(1),
(2) Date: Mar. 1, 2021

(87) PCT Pub. No.: WO2020/043048
PCT Pub. Date: Mar. 5, 2020

(65) Prior Publication Data
US 2021/0351939 A1 Nov. 11, 2021

(30) Foreign Application Priority Data
Aug. 30, 2018 (CN) .......................... 201811005413.3

(51) Int. Cl.
*H04L 9/32* (2006.01)
*G06F 16/27* (2019.01)
*G06F 16/901* (2019.01)

(52) U.S. Cl.
CPC ............ *H04L 9/3268* (2013.01); *G06F 16/27* (2019.01); *G06F 16/9017* (2019.01); *H04L 9/3236* (2013.01)

(58) Field of Classification Search
CPC ....... H04L 9/3268; H04L 9/3236; H04L 9/50; H04L 63/12; H04L 2209/56;
(Continued)

(56) References Cited

U.S. PATENT DOCUMENTS

2017/0132621 A1* 5/2017 Miller .................. H04L 9/0637
2020/0389291 A1* 12/2020 Xiao .................. H04L 67/1095

* cited by examiner

*Primary Examiner* — Jacob Lipman
(74) *Attorney, Agent, or Firm* — Raymond Y. Chan; David and Raymond Patent Firms (57) ABSTRACT

A data synchronization method for a parachain includes a step of obtaining first block operation sequence information, synchronizing blocks of a main chain according to the first block operation sequence information to generate or update the parachain, wherein the first block operation sequence information is obtained by updating the first block after the main chain receives a plurality of transaction information sent by a client user terminal to perform consensus on the transaction information and to generate the first block and to record the operation serial number of the first block, wherein the first block operation sequence information includes an operation serial number and operation information of each block of the main chain, and an operation serial number and operation information of the block revoked by a node of the main chain when the block revoking is executed.

18 Claims, 5 Drawing Sheets

(58) Field of Classification Search
CPC ....... H04L 9/0891; H04L 9/3239; H04L 9/12;
G06F 16/27; G06F 16/9017
USPC ...................................................... 713/156
See application file for complete search history.

FIG. 1

Obtain first block operation sequence information, synchronize blocks of a main chain according to the first block operation sequence information to generate or update the parachain, wherein the first block operation sequence information is obtained by updating the first block after the main chain receives a plurality of transaction information sent by a client user terminal to perform consensus on the transaction information and to generate the first block and to record the operation serial number of the first block, wherein the first block operation sequence information comprises an operation serial number and operation information of each block of the main chain, and an operation serial number and operation information of the block revoked by a node of the main chain when the block revoking is executed ⸺ S12

PARACHAIN DATA SYNCHRONIZATION METHOD, DEVICE AND STORAGE MEDIUM

BACKGROUND OF THE PRESENT INVENTION

Field of Invention

The present invention relates to a field of Internet financial technology, and more particularly to a parachain data synchronization method, device and storage medium.

Description of Related Arts

In order to prevent the problem of inconsistent block information of the parachain synchronization of each node due to the bifurcation of the main chain in the existing parachain data synchronization mode, parachain uses a method of synchronizing block information that lags behind the height of blocks of the main chain. Take a crypto currency of the block chain as an example, considered that after a block is packaged and generated and after six block heights, the block has been confirmed basically. If the block height of the block on the node of the main chain is set as H, then the parallel chain of the node will synchronize the block after the block height is at least H+6. Even after six block heights, different nodes of the parachain will still synchronize to different block information once the main chain has bifurcation to cause the problem of inconsistency of each node in the parachain.

SUMMARY OF THE PRESENT INVENTION

In view of the above drawbacks of the existing parachain mechanism, it is desirable to provide a parachain data synchronization method, device and storage medium, which can rapidly synchronize main chain block data without any inconsistent parachain data of each node due to the bifurcation or other reasons.

In accordance with an aspect of the invention, the present invention comprises a parachain data synchronization method, which is configured for nodes of a parachain, comprising a step of:

obtaining first block operation sequence information, synchronizing blocks of a main chain according to the first block operation sequence information to generate or update a parachain, the first block operation sequence information further comprising an operation serial number and operation information of a block revoked by a node of the main chain when the block revoking is executed, wherein the first block operation sequence information is obtained by updating the first block after the main chain receives a plurality of transaction information sent by a client user terminal to perform consensus on the transaction information and to generate the first block and to record the operation serial number of the first block, wherein the first block operation sequence information comprises an operation serial number and operation information of each block of the main chain.

In accordance with another aspect of the invention, the present invention comprises a parachain data synchronization method, which is configured for nodes of a main chain, comprising a step of:

receiving a plurality of transaction information sent by the user client terminal; and processing a consensus of the transaction information and generating the first block, and recording the operation serial number and operation information of the first block and updating the first block operation sequence information for the parachain nodes to obtain the first block operation sequence information. According to the first block operation sequence information, the blocks of the main chain are synchronized to generate or update the parachain, wherein the first block operation sequence information includes the operation serial number and operation information of each block of the main chain, and an operation serial number and operation information of the block revoked by a node of the main chain when the block revoking is executed.

In accordance with a third aspect of the invention, the present invention comprises a device, which comprises one or more processors and memories, wherein the memory contains instructions adapted for being executed by the one or more processors, such that the one or more processors are able to execute the parachain data synchronization method according to different embodiments of the present invention.

In accordance with a fourth aspect of the invention, the present invention comprises a storage medium that stores a computer program for enabling a computer to execute the parachain data synchronization method according to different embodiment of the present invention.

For different embodiments, the present invention provides the parachain data synchronization method, device, and storage medium. The blocks of the main chain are synchronized according to the first block operation sequence information to generate or update the parachain. The first block operation sequence information further includes the operation serial number and operation information of the block revoked by the node of the main chain when the block revoking is executed, wherein the first block operation sequence information is obtained by updating after the main chain receives a plurality of transaction information sent by the client user then to perform consensus on the transaction information and generate the first block and after recording the operation serial number of the first block. The first block operation sequence information includes the operation serial number of each block of the main chain and a method of operation information for achieving a parachain data synchronization method that can rapidly synchronize main chain block data without any inconsistent parachain data of each node due to the bifurcation or other reasons.

For different embodiments of the parachain data synchronization method, device, and storage medium, the present invention is able to avoid the misunderstanding of stop generating new blocks when the parachain has no transactions for a long period of time, and to optimize the user experience by monitoring whether the first block and the preset block height range generating other blocks or empty blocks.

BRIEF DESCRIPTION OF THE DRAWINGS

These and other objectives, features, and advantages of the present invention will become apparent from the following detailed description and the accompanying drawings.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

It should be understood that the embodiments in the present invention and the features in the embodiments can be combined with each other without any conflict. These and other objectives, features, and advantages of the present invention will become apparent from the following detailed description and the accompanying drawings.

Figure 1:
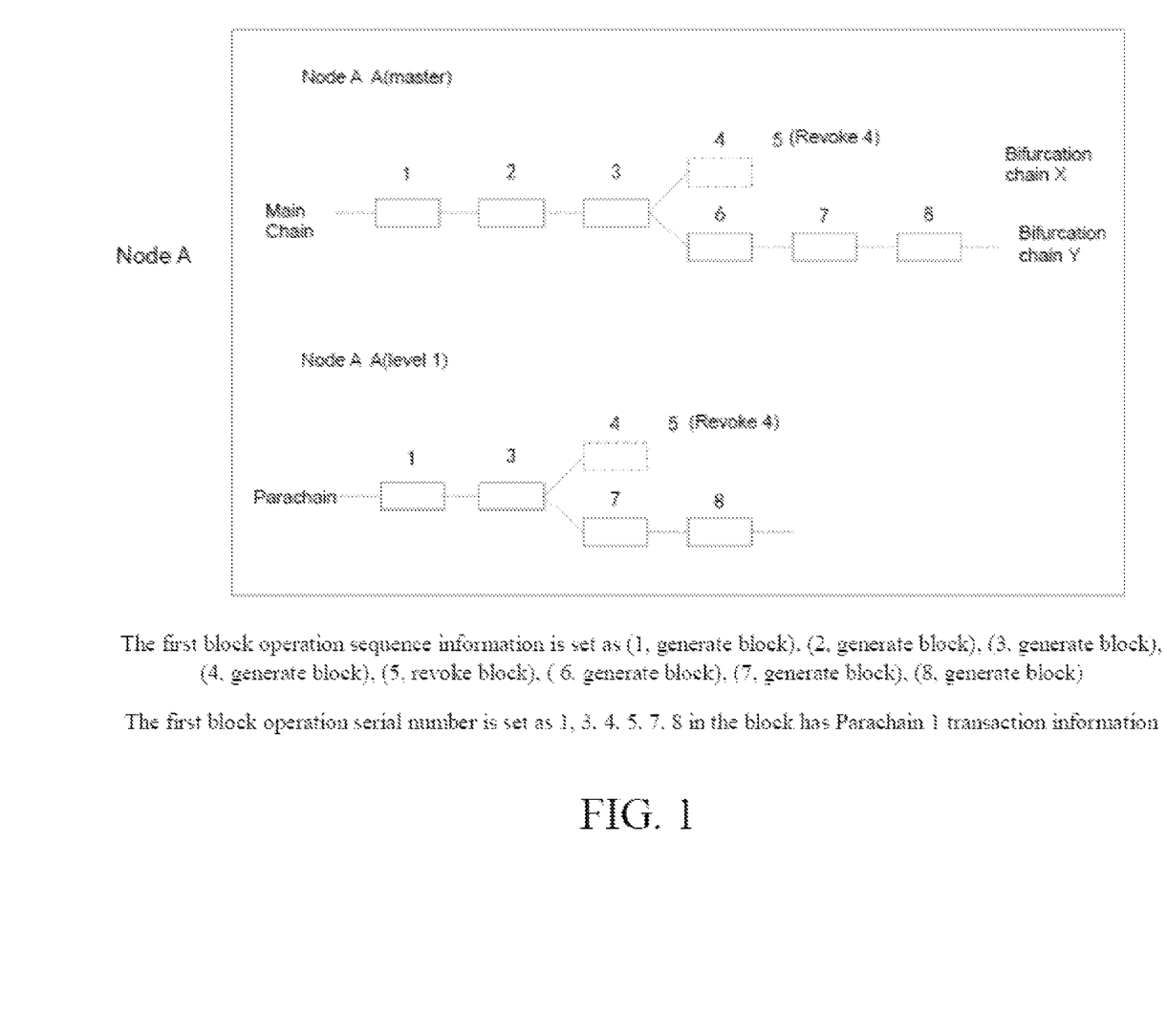
FIG. 1 is a schematic diagram of an application of a parachain data synchronization according to a preferred embodiment of the present invention.

FIG. 1 is a schematic diagram of an application of a parachain data synchronization according to a preferred embodiment of the present invention. As shown in FIG. 1 of the preferred embodiment, through recording block operation sequence information, a parachain 1 is configured to rapidly synchronize data information of a main chain, and node A is configured to provide services for the main chain and the parachain 1 at the same time. When the node A is arranged to serve the main chain, A (master) is arranged to receive the transaction information sent by the client user, to agree on transaction information, and to generate a first block. Furthermore, the operation serial number and operation information of the first block are recorded, and the operation sequence information of the first block is updated for the nodes of the parachain obtaining the operation sequence information of the first block. The blocks of the main chain are synchronized according to the first block operation sequence information to generate or update the parachain. A (Master) is arranged to generate the block with operation serial number "4" of the first block after generating the block with operation serial number "3" of the first block. Assuming that a bifurcation chain containing the block with the operation serial number "4" for the first block is set as a bifurcation chain X. When A (master) finds another bifurcation chain Y with a length is longer than the length of bifurcation chain X, and the length difference therebetween is greater than a predetermined threshold, A (master) is arranged to revoke the block with the operation serial number "4" for the first block, and the operation is arranged to assign the first block operation serial number as "5". A (master) is arranged to synchronize the first block on the bifurcation chain Y, and the operation is arranged to assign the first block operation serial number as "6". A (master) is arranged to synchronize the second block on the bifurcation chain Y, and the operation is arranged to assign the first block operation serial number as "7" until the latest block is synchronized on the bifurcation chain Y. A (master) is configured to generate the first block operation sequence information, (1, generate block), (2, generate block), (3, generate block), (4, generate block), (5, revoke block), (6, generate block), (7, generate block), (8, generate block). When the node A is arranged to serve the parachain, A (level 1) is configured to obtain the operation sequence information of the first block. The blocks of the main chain are synchronized according to the operation sequence information of the first block to generate or update the parachain. The first block operation sequence information further includes the operation serial number and operation information of the block revoked by the node of the main chain when the block revoking is executed, wherein the first block operation sequence information is obtained by updating after the main chain receives a plurality of transaction information sent by the client user then to perform consensus on the transaction information and generate the first block and after recording the operation serial number of the first block. The first block operation sequence information includes the operation serial number and operation information of each block of the main chain. The first block operation sequence information is set as (1, generate block), (2, generate block), (3, generate block), (4, generate block), (5, revoke block), (6, generate block), (7, generate block), (8, generate block), wherein the first block operation serial number is set as 1, 3, 4, 5, 7, 8 in the block has Parachain 1 transaction information. Therefore, on parachain 1, A (level 1) is configured to synchronize the data of the first block with the operation serial numbers are 1, 3, 4, 5, 7, and 8.

Figure 2:
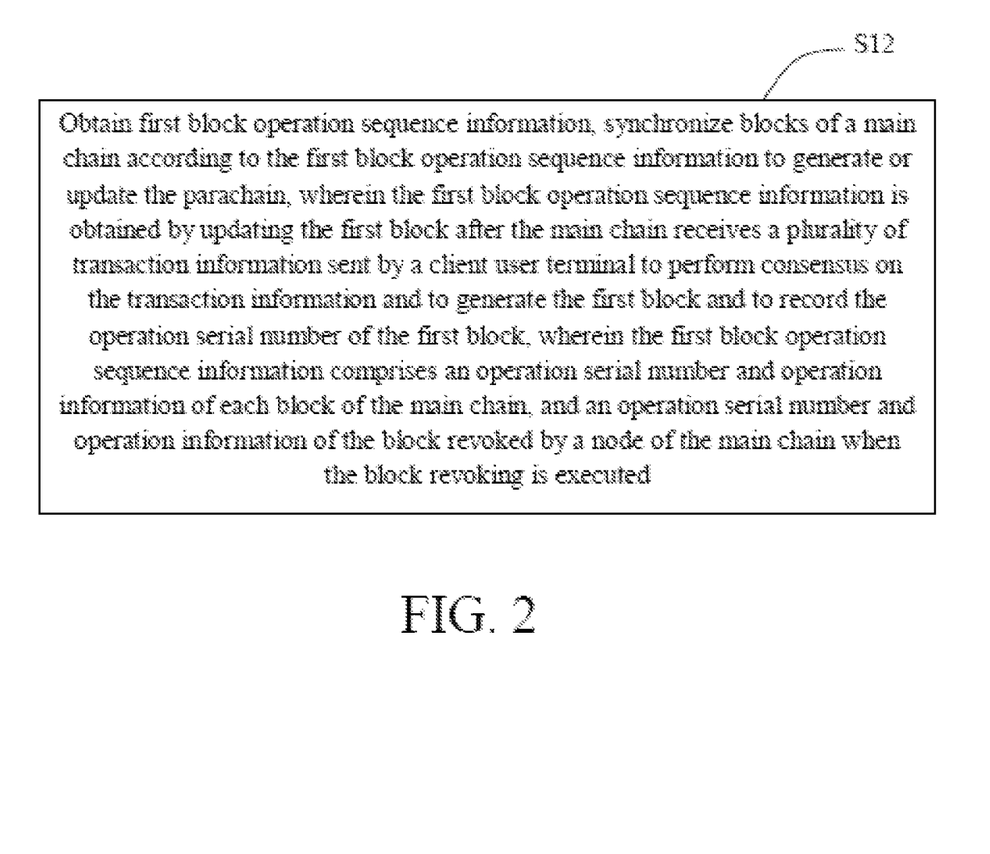
FIG. 2 is a flowchart of a parachain data synchronization method according to the above preferred embodiment of the present invention.

FIG. 2 is a flowchart of a parachain data synchronization method according to the above preferred embodiment of the present invention. As shown in FIG. 2 of the preferred embodiment, the present invention provides a parachain data synchronization method, comprising the following steps.

S12: obtain first block operation sequence information, synchronize blocks of a main chain according to the first block operation sequence information to generate or update a parachain, the first block operation sequence information further comprising an operation serial number and operation information of a block revoked by a node of the main chain when the block revoking is executed, wherein the first block operation sequence information is obtained by updating the first block after the main chain receives a plurality of transaction information sent by a client user terminal to perform consensus on the transaction information and to generate the first block, and records the operation serial number of the first block, wherein the first block operation sequence information comprises an operation serial number and operation information of each block of the main chain.

Particularly, as an example of the application as shown in FIG. 1, the block operation sequence information is set as (1, generate block), (2, generate block), (3, generate block), (4, generate block), (5, revoke block), (6, generate block), (7, generate block), (8, generate block). The first block with the operation serial numbers of 1, 3, 4, 5, 7, and 8 contains the transaction information of parachain 1. A (Level 1) is arranged to synchronize the related transaction information to parachain 1 in the first block with the operation sequence numbers of 1, 3, 4, 5, 7, and 8. The transaction information is packaged to generate the second block of parachain 1, and the operation serial number of the second block is recorded for the second block.

In the step S12, A (level 1) is configured to obtain first block operation sequence information, synchronize blocks of a main chain according to the first block operation sequence information to generate or update a parachain, the first block operation sequence information further comprising an operation serial number and operation information of a block revoked by a node of the main chain when the block revoking is executed, wherein the first block operation sequence information is obtained by updating the first block after the main chain receives a plurality of transaction information sent by a client user terminal to perform consensus on the transaction information and to generate the first block and records the operation serial number of the first block, wherein the first block operation sequence information comprises an operation serial number and operation information of each block of the main chain. Since the first block operation sequence information is set as (1, generate block), (2, generate block), (3, generate block), (4, generate block), (5, revoke block), (6, generate block), (7, generate block), (8, generate block), the first block with the operation serial numbers of 1, 3, 4, 5, 7, and 8 contains the transaction information of parachain 1. A (Level 1) is arranged to synchronize the related transaction information to parachain 1 in the first block with the operation serial numbers of 1, 3, 4, 5, 7, and 8, and to package the transaction information to generate the parachain 1 and to record the operation serial number of the second block for the second block. Therefore, by synchronizing the first block with the operation serial numbers of 1, 3, 4, 5, 7, and 8, A (level 1) is configured to generate the second block with the second operation serial number 1, to generate the second block with the second operation serial number 3, to generate the second block with the second operation serial number 4, to generate the second block with the second operation serial number 5, to generate the second block with the second operation serial number 7, and to generate the second block with the second operation serial number 8.

The above embodiment is an example to illustrate the parachain data synchronization method of the present invention, the example is that the first block operation sequence information is set as (1, generate block), (2, generate block), (3, generate block), (4, generate block), (5, revoke block), (6, generate block), (7, generate block), (8, generate block), the first block with the operation serial numbers of 1, 3, 4, 5, 7, and 8 contains the transaction information of parachain 1, wherein the parachain nodes are arranged to synchronize the related transaction information to parachain 1 in the first block with the operation serial numbers of 1, 3, 4, 5, 7, and 8, and to package the transaction information to generate the parachain and to record the operation serial number of the second block for the second block. In another embodiment, the parachain data synchronization method of the present invention should not be limited to the above example. The nodes of the parachain can synchronize the data information of the entire block of the second block according to the actual needs. Alternatively, the nodes of the parachain can synchronize only the transaction information related to the parachain in the second block. The nodes of the parachain can obtain the operation sequence information of the first block at regular intervals according to actual needs, or can obtain the operation sequence information of the first block in a real time manner, wherein both of the above example can achieve the same technical result.

Figure 3:
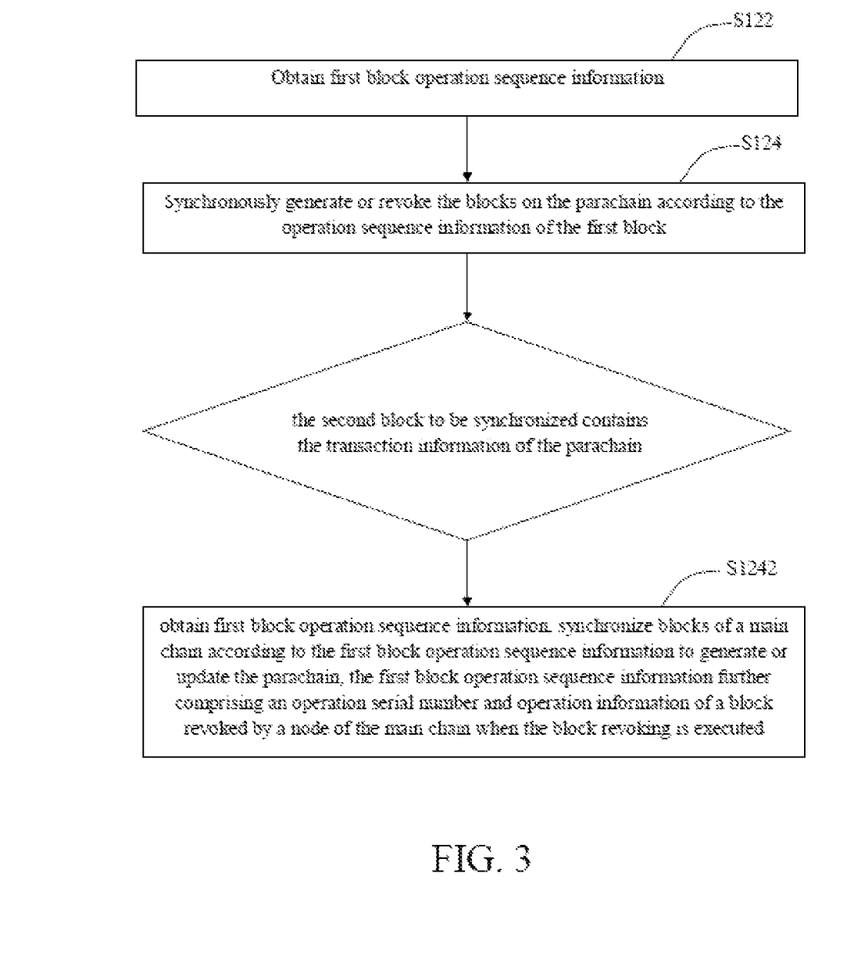
FIG. 3 is a flowchart of the parachain data synchronization method according to the above preferred embodiment of the present invention, illustrating a modification in FIG. 2.

FIG. 3 is a flowchart of the parachain data synchronization method according to the above preferred embodiment of the present invention, illustrating a modification in FIG. 2. As shown in FIG. 3 of the preferred embodiment, the step of obtaining first block operation sequence information and synchronizing blocks of a main chain according to the first block operation sequence information to generate or update a parachain, further comprises the following steps.

S112: Obtain the first block operation sequence information.

S124: Synchronously generate or revoke the blocks on the parachain according to the operation sequence information of the first block, wherein when the operation information identifies a generation of the block, synchronously generating or revoking the block on the parachain according to the first block operation sequence information further comprises the following step.

S1242: Determine whether the second block to be synchronized contains the transaction information of the parachain, if not, the second block is not synchronized.

Particularly, as an example of the application as shown in FIG. 1, the block operation sequence information is set as (1, generate block), (2, generate block), (3, generate block), (4, generate block), (5, revoke block), (6, generate block), (7, generate block), (8, generate block). The first block with the operation serial numbers of 1, 3, 4, 5, 7, and 8 contains the transaction information of parachain 1. A (Level 1) is arranged to synchronize the related transaction information to parachain 1 in the first block with the operation sequence numbers of 1, 3, 4, 5, 7, and 8.

In the step S122, A (level 1) is configured to obtain operation sequence information of the first block.

In the step S124, A (level 1) is configured to synchronously generate or revoke the blocks on the parachain according to the operation sequence information of the first block, wherein when the operation information identifies a generation of the block, synchronously generating or revoking the block on the parachain according to the first block operation sequence information further comprises the following step.

In the step S1242, A (level 1) is configured to determine whether the second block to be synchronized contains the transaction information of the parachain, if not, the second block is not synchronized.

For example, if the current synchronized second block is the first block with operation serial number "2" and the block does not contain the transaction information of parachain 1, then A (level 1) will not synchronize the second block. If the current synchronized second block is the first block with operation serial number "3" and the block contains the transaction information of parachain 1, then A (level 1) will synchronize the second block.

In another embodiment, the nodes of the parachain can synchronize the data information of the entire block of the second block according to the actual needs. Alternatively, the nodes of the parachain can synchronize only the transaction information related to the parachain in the second block. Both of the above example can achieve the same technical result.

According to the preferred embodiment, the transaction information contains a first identifier, a first index, and a first heading. The first identifier is configured to identify the transaction information of the main chain or the transaction information of the parachain. The first index is configured to identify a heading of the parachain at a location of the transaction information. The first heading is configured to identify the heading of the asset in the transaction information. Assuming that the user client terminal sends a transaction information to the main chain, wherein the transaction information contains: p.ParaChain1.token1. The first identifier of the transaction information is p to indicate the transaction information as parachain transaction information. The first index of the transaction information is ParaChain1 to indicate that the location of the transaction information is 1. The first heading of the transaction information is token1 to indicate that the heading of the asset of the transaction is token1. According to the preferred embodiment as an example, the first identifier is configured to identify the transaction information of the main chain or the transaction information of the parachain, the first index is configured to identify a heading of the parachain at a location of the transaction information, and the first heading is configured to identify the heading of the asset in the transaction information. In another embodiment, different parameters can also be configured for the first identifier, the first index, and the first heading according to the actual needs. Both of the examples can achieve the same technical result.

According to the preferred embodiment, the first block is monitored, wherein if it is not detected that the first block contains transaction information within a predetermined height range of the blocks, an empty block is generated. Assuming that a preset block height range is 100 block height range, after the parachain generates a block when the block height is H, if no block is generated within the 100 block height range, empty block is generated at the block height of H+101.

Figure 4:
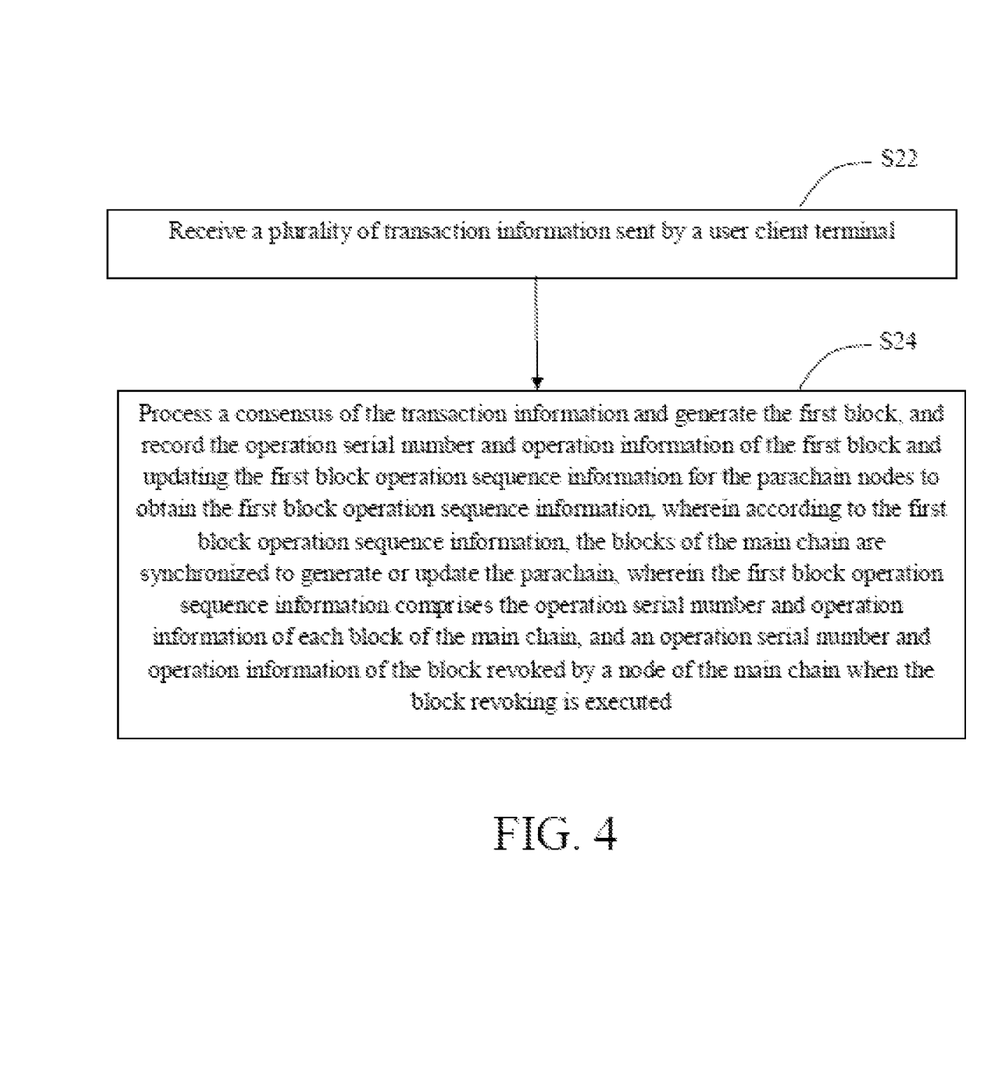
FIG. 4 is a flowchart of the parachain data synchronization method according to the above preferred embodiment of the present invention.

FIG. 4 is a flowchart of a parachain data synchronization method according to the preferred embodiment of the present invention. As shown in FIG. 4 of the preferred embodiment, the present invention provides a parachain data synchronization method, comprising the following steps.

S22: Receive a plurality of transaction information sent by the user client terminal.

S24: Process a consensus of the transaction information and generate the first block, and record the operation serial number and operation information of the first block and update the first block operation sequence information for the parachain nodes to obtain the first block operation sequence information. According to the first block operation sequence information, the blocks of the main chain are synchronized to generate or update the parachain, wherein the first block operation sequence information includes the operation serial number and operation information of each block of the main chain, and an operation serial number and operation information of the block revoked by a node of the main chain when the block revoking is executed.

Particularly, as an example of the application as shown in FIG. 1, A (Master) is configured to generate a block with the operation number "4" of the first block after generating a block with the operation number "3" of the first block. Assuming that a bifurcation chain containing the block with the operation serial number "4" for the first block is set as a bifurcation chain X. When A (master) finds another bifurcation chain Y with a length is longer than the length of bifurcation chain X, and the length difference therebetween is greater than a predetermined threshold, A (master) is arranged to revoke the block with the operation serial number "4" for the first block, and the operation is arranged to assign the first block operation serial number as "5". A (master) is arranged to synchronize the first block on the bifurcation chain Y, and the operation is arranged to assign the first block operation serial number as "6". A (master) is arranged to synchronize the second block on the bifurcation chain Y, and the operation is arranged to assign the first block operation serial number as "7" until the latest block is synchronized on the bifurcation chain Y.

In the step S22, A (master) is configured to receive a plurality of transaction information sent by the client user terminal.

In the step S24, A (master) is configured to process the consensus of the transaction information and generate the first block, and to record the operation serial number and operation information of the first block and to update the first block operation sequence information for the parachain nodes to obtain the first block operation sequence information. According to the first block operation sequence information, the blocks of the main chain are synchronized to generate or update the parachain, wherein the first block operation sequence information includes the operation serial number and operation information of each block of the main chain, and an operation serial number and operation information of the block revoked by a node of the main chain when the block revoking is executed. A (Master) is configured to generate a block with the operation number "4" of the first block after generating a block with the operation number "3" of the first block. The bifurcation chain containing the block with the operation serial number "4" for the first block is set as a bifurcation chain X. Since A (master) finds another bifurcation chain Y with a length is longer than the length of bifurcation chain X, and the length difference therebetween is greater than a predetermined threshold, A (master) is arranged to revoke the block with the operation serial number "4" for the first block, and the operation is arranged to assign the first block operation serial number as "5". A (master) is arranged to synchronize the first block on the bifurcation chain Y, and the operation is arranged to assign the first block operation serial number as "6". A (master) is arranged to synchronize the second block on the bifurcation chain Y, and the operation is arranged to assign the first block operation serial number as "7" until the latest block is synchronized on the bifurcation chain Y.

According to the preferred embodiment, the transaction information contains a first identifier, a first index, and a first heading. The first identifier is configured to identify the transaction information of the main chain or the transaction information of the parachain. The first index is configured to identify a heading of the parachain at a location of the transaction information. The first heading is configured to identify the heading of the asset in the transaction information. Assuming that the user client terminal sends a transaction information to the main chain, wherein the transaction information contains: p.ParaChain1.token1. The first identifier of the transaction information is p to indicate the transaction information as parachain transaction information. The first index of the transaction information is ParaChain1 to indicate that the location of the transaction information is 1. The first heading of the transaction information is token1 to indicate that the heading of the asset of the transaction is token1. According to the preferred embodiment as an example, the first identifier is configured to identify the transaction information of the main chain or the transaction information of the parachain, the first index is configured to identify a heading of the parachain at a location of the transaction information, and the first heading is configured to identify the heading of the asset in the transaction information. In another embodiment, different parameters can also be configured for the first identifier, the first index, and the first heading according to the actual needs. Both of the examples can achieve the same technical result.

Figure 5:
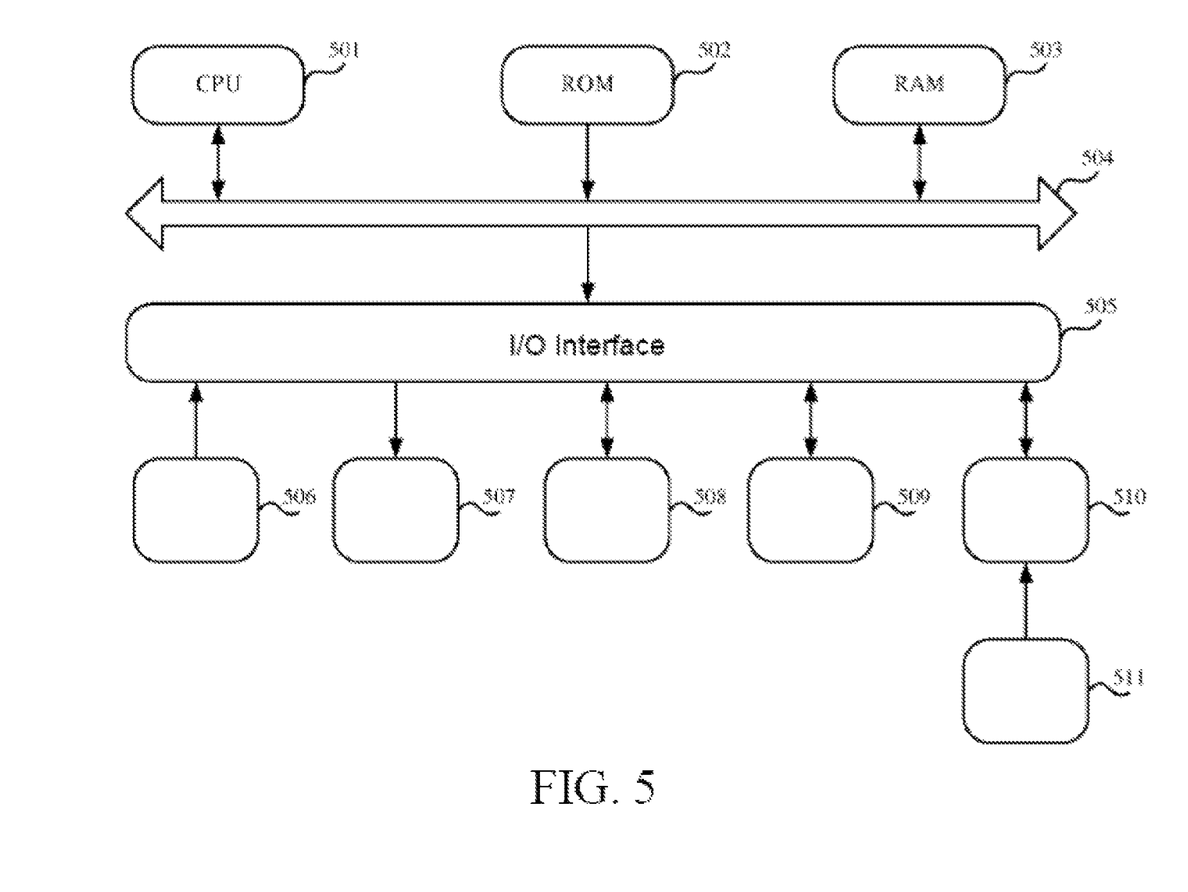
FIG. 5 is a schematic diagram of the parachain data synchronization device according to the above preferred embodiment of the present invention.

FIG. 5 is a schematic diagram of a device according to the preferred embodiment of the present invention.

As shown in FIG. 5 as another aspect, the present invention further provides a device 500 which comprises one or more central processing units (CPU) 501, wherein the central processing units (CPU) 501 are configured to execute different appropriate actions and processing according to a program stored in a read only memory (ROM) 502 or a program loaded from the storage medium 508 in a random access memory (RAM) 503. Various programs and data required for the operation of the device 500 are also stored in the RAM 503. The CPU 501, ROM 502, and RAM 503 are operatively connected with each other through a bus 504. An input/output (I/O) interface 505 is also operatively connected to the bus 504.

The I/O interface 505 are also operatively connected to: an input unit 506 such as keyboard and mouse, an output unit 507 such as cathode ray tube (CRT), liquid crystal display (LCD), etc. and speakers, the storage medium 508 such as a hard disk, and a communication unit 509 such as a network interface card i.e. a LAN card, a modem, and the like. The communication unit 509 is configured to perform communication processing via a network such as the Internet. A driver 510 is also operatively connected to the I/O interface 505 as needed. A removable medium 511, such as a magnetic disk, an optical disk, a magneto-optical disk, a semiconductor memory, etc., is installed on the drive 510 as needed, such that the computer can read the installed into the storage medium 508 as needed.

Particularly, according to the preferred embodiment of the present invention, the parachain consensus method mentioned in any of the above embodiments can be implemented as a computer software program. For example, the above embodiments of the present invention can be a computer program product, which includes a tangibly machine-readable medium of a computer program, wherein the computer program contains program code for executing the parachain consensus method. According to the preferred embodiment, the computer program can be downloaded and installed via the network through the communication unit 509, and/or installed from the removable medium 511.

In another aspect, the present invention also provides a computer-readable storage medium which can be embodied as the computer-readable storage medium including the device of the above mentioned embodiment. It can also be a stand-alone medium and is not assembled into the device. The computer-readable storage medium is configured to store one or more programs, wherein the programs can be executed by one or more processors to perform the parachain consensus method described in the present invention.

The flowcharts and block diagrams in the accompanying drawings illustrate the implementation architecture, functions, and operations of the system, method, and computer program product according to the above mentioned embodiments of the present invention. Accordingly, each block in the flowchart or block diagram can represent a module, program segment, or a portion of code, wherein the module, program segment, or the portion of code contains one or more executable instructions for achieving the specified logical function. It should also be understood that, in other alternative implementations, the functions indicated in the block may also provide in a different order shown in the drawings. For example, two successive blocks can be executed in parallel. Alternatively they can be executed in the reverse order, depending on the corresponding functions. It is worth mentioning that each block in the block diagram and/or flowchart, and a combination of blocks in the block diagram and/or flowchart, can be implemented by a dedicated hardware-based system adapted to perform the specified functions or operations. Alternatively, it can be achieved by a combination of dedicated hardware and computer instructions.

The units or modules in the embodiments of the present invention can be implemented in software or hardware. The mentioned units or modules may also be arranged in the processor. For example, each of the mentioned units may be a software program arranged in a computer or a mobile smart device, or may be an individually configured hardware device. Accordingly, the names of these units or modules do not constitute any limitation on the units or modules themselves under certain circumstances.

The above description is disclosed to enable any person skilled in the art to make and use the present invention. It will thus be seen that the objects of the present invention have been fully and effectively accomplished. The embodiments have been shown and described for the purposes of illustrating the functional and structural principles of the present invention and is subject to change without departure from such principles. For example, the above-mentioned features and the technical features disclosed in the present invention (but not limited to) with similar functions are mutually replaced to form a technical solution.

What is claimed is:

1. A data synchronization method for a parachain, which is configured for nodes of the parachain, comprising the steps of:
   (a) obtaining first block operation sequence information; and
   (b) synchronizing blocks of a main chain according to the first block operation sequence information to generate or update the parachain, wherein the first block operation sequence information is obtained by updating a first block after the main chain receives a plurality of transaction information sent by a client user terminal to perform consensus on the transaction information and to generate the first block and to record the operation serial number of the first block;
   wherein the first block operation sequence information comprises:
   an operation serial number and operation information of each block of the main chain; and
   an operation serial number and operation information of a block revoked by a node of the main chain when block revoking is executed.

2. The method, as recited in claim 1, wherein the transaction information comprises a first identifier, a first index, and a first heading, wherein the first identifier is configured to identify one of the transaction information of the main chain and the transaction information of the parachain, wherein the first index is configured to identify a heading of the parachain at a location of the transaction information, wherein the first heading is configured to identify the heading of an asset in the transaction information.

3. The method, as recited in claim 1, further comprising the steps of:
   monitoring the first block; and
   generating an empty block if it is not detected that the first block contains transaction information within a predetermined height range of the blocks.

4. The method, as recited in claim 1, wherein the step (b) comprises a step of:
   (b.1) synchronously generating or revoking the blocks on the parachain according to the first block operation sequence information, wherein when the operation information identifies a generation of the block, the step (b.1) further comprises a step of:
   (b.1.1) determining whether a second block to be synchronized contains the transaction information of the parachain, if not, the second block is not synchronized.

5. The method, as recited in claim 4, further comprising the steps of: monitoring the first block; and
   generating an empty block if it is not detected that the first block contains transaction information within a predetermined height range of the blocks.

6. The method, as recited in claim 4, wherein the transaction information comprises a first identifier, a first index, and a first heading, wherein the first identifier is configured to identify one of the transaction information of the main chain and the transaction information of the parachain, wherein the first index is configured to identify a heading of the parachain at a location of the transaction information, wherein the first heading is configured to identify the heading of an asset in the transaction information.

7. The method, as recited in claim 6, further comprising the steps of:
monitoring the first block; and
generating an empty block if it is not detected that the first block contains transaction information within a predetermined height range of the blocks.

8. A data synchronization method, which is configured for nodes of the main chain, comprising the steps of:
receiving a plurality of transaction information sent by a user client terminal;
processing a consensus of the transaction information and generating a first block;
recording an operation serial number and operation information of the first block and
updating the first block operation sequence information for parachain nodes to obtain first block operation sequence information, wherein according to the first block operation sequence information, the blocks of the main chain are synchronized to generate or update the parachain, wherein the first block operation sequence information comprises:
an operation serial number and operation information of each block of the main chain; and
an operation serial number and operation information of a block revoked by a node of the main chain when block revoking is executed.

9. The method, as recited in claim 8, wherein the transaction information comprises a first identifier, a first index, and a first heading, wherein the first identifier is configured to identify one of the transaction information of the main chain and the transaction information of the parachain, wherein the first index is configured to identify a heading of the parachain at a location of the transaction information, wherein the first heading is configured to identify the heading of an asset in the transaction information.

10. A device for parachain data synchronization, comprising:
one or more processors; and
a memory that stores one or more programs executed by the one or more processors;
wherein, for nodes of a parachain, the one or more processors are configured to:
obtain first block operation sequence information; and
synchronize blocks of a main chain according to the first block operation sequence information to generate or update the parachain, wherein the first block operation sequence information is obtained by updating a first block after the main chain receives a plurality of transaction information sent by a client user terminal to perform consensus on the transaction information and to generate the first block and to record the operation serial number of the first block;
wherein the first block operation sequence information comprises:
an operation serial number and operation information of each block of the main chain; and
an operation serial number and operation information of the block revoked by a node of the main chain when the block revoking is executed.

11. The device, as recited in claim 10, wherein the transaction information comprises a first identifier, a first index, and a first heading, wherein the first identifier is configured to identify one of the transaction information of the main chain and the transaction information of the parachain, wherein the first index is configured to identify a heading of the parachain at a location of the transaction information, wherein the first heading is configured to identify the heading of an asset in the transaction information.

12. The device, as recited in claim 10, wherein, for the nodes of the parachain, the one or more processors are configured to:
monitor the first block; and
generate an empty block if it is not detected that the first block contains transaction information within a predetermined height range of the blocks.

13. The device, as recited in claim 10, wherein, for nodes of the main chain, the one or more processors are configured to:
receive the transaction information sent by the user client terminal;
process the consensus of the transaction information and generate the first block;
record the operation serial number and the operation information of the first block and
update the first block operation sequence information for the parachain nodes to obtain the first block operation sequence information, wherein according to the first block operation sequence information, the blocks of the main chain are synchronized to generate or update the parachain.

14. The device, as recited in claim 13, wherein the transaction information comprises a first identifier, a first index, and a first heading, wherein the first identifier is configured to identify one of the transaction information of the main chain and the transaction information of the parachain, wherein the first index is configured to identify a heading of the parachain at a location of the transaction information, wherein the first heading is configured to identify the heading of an asset in the transaction information.

15. The device, as recited in claim 10, wherein, for the nodes of the parachain, the one or more processors are configured to:
synchronously generate or revoke the blocks on the parachain according to the first block operation sequence information, wherein when the operation information identifies a generation of the block, the one or more processors are configured to:
determine whether a second block to be synchronized contains the transaction information of the parachain, if not, the second block is not synchronized.

16. The device, as recited in claim 15, wherein, for the nodes of the parachain, the one or more processors are configured to:
monitor the first block; and
generate an empty block if it is not detected that the first block contains transaction information within a predetermined height range of the blocks.

17. The device, as recited in claim 15, wherein the transaction information comprises a first identifier, a first index, and a first heading, wherein the first identifier is configured to identify one of the transaction information of the main chain and the transaction information of the parachain, wherein the first index is configured to identify a heading of the parachain at a location of the transaction information, wherein the first heading is configured to identify the heading of an asset in the transaction information.

18. The device, as recited in claim 17, wherein, for the nodes of the parachain, the one or more processors are configured to:
   monitor the first block; and
   generate an empty block if it is not detected that the first block contains transaction information within a predetermined height range of the blocks.

* * * * *